United States Patent [19]

Garay et al.

[11] Patent Number: 4,661,992
[45] Date of Patent: Apr. 28, 1987

[54] SWITCHLESS EXTERNAL ANTENNA CONNECTOR FOR PORTABLE RADIOS

[75] Inventors: Oscar Garay, North Lauderdale; Harvey N. Turner, Jr., Tamarac; Quirino Balzano, Plantation, all of Fla.

[73] Assignee: Motorola Inc., Schaumburg, Ill.

[21] Appl. No.: 760,854

[22] Filed: Jul. 31, 1985

[51] Int. Cl.[4] .................. H04B 1/38; H04B 1/08; H04B 1/04
[52] U.S. Cl. ...................... 455/89; 455/90; 455/129; 455/346; 455/348; 339/75 M; 343/851
[58] Field of Search ............ 455/89, 99, 345, 346, 455/348, 349, 351, 129, 74.90; 312/7.1; 339/75 M; 200/51.09; 343/702, 850–852, 860

[56] References Cited

U.S. PATENT DOCUMENTS

| | | |
|---|---|---|
| 3,917,372 | 11/1975 | Selinko .................. 455/346 |
| 3,946,390 | 3/1976 | Alexander et al. . |
| 4,031,468 | 6/1977 | Ziebell et al. . |
| 4,091,318 | 5/1978 | Eichler et al. .......... 455/90 |
| 4,106,025 | 8/1978 | Katz .................... 455/129 |
| 4,193,076 | 3/1980 | Ito et al. . |
| 4,286,335 | 8/1981 | Eichler et al. . |
| 4,313,119 | 1/1982 | Garay et al. . |

OTHER PUBLICATIONS

COMCO Model 812 Portacom, "All-Solid-State Mobile/Portable Transceiver", 1/74.

Primary Examiner—Jin F. Ng
Attorney, Agent, or Firm—Martin J. McKinley; Daniel K. Nichols; Joseph T. Downey

[57] ABSTRACT

A portable radio transceiver and mobile mount housing are disclosed which utilize a switchless connector for connecting the portable unit to an external antenna which is electrically coupled to the mobile mount. In the preferred embodiment, the portable radio is equipped with an internal antenna which is either coupled to an electrical contact on the exterior of the portable unit adaptable to making electrical contact with a similar contact on the inside of the mobile housing when the portable radio is inserted therein. The internal antenna in the portable unit is shielded by the metallic mobile mount housing which obviates the need to disconnect the same. In one embodiment the contact disposed on the portable unit exterior is connected to a predetermined point on the internal antenna for impedance matching with the external antenna when the portable unit is inserted into the mobile mount housing. Similar switchless contacts can also be utilized for connecting the portable unit to external microphones, speakers, battery chargers and the like.

8 Claims, 7 Drawing Figures

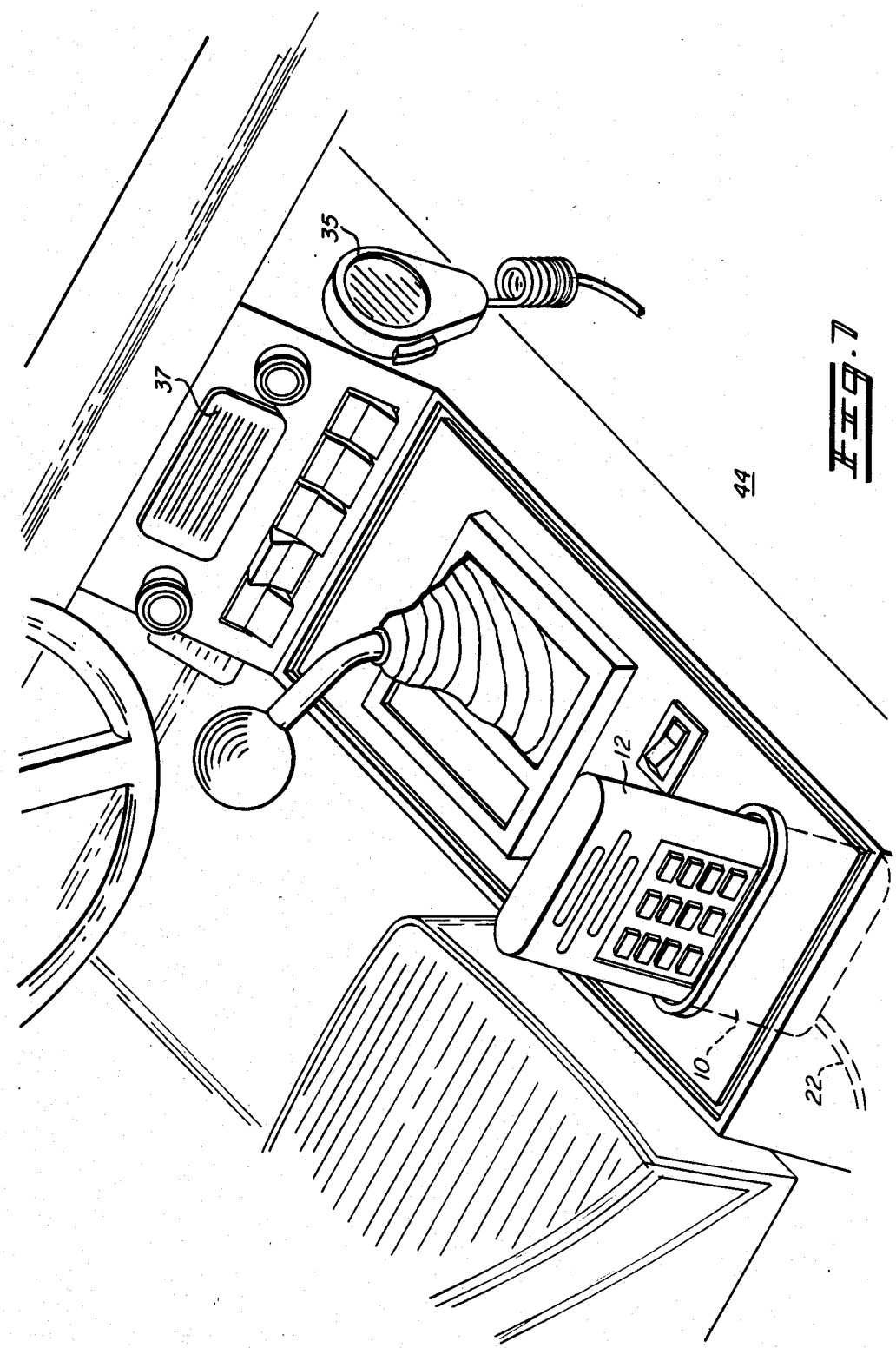

SWITCHLESS EXTERNAL ANTENNA CONNECTOR FOR PORTABLE RADIOS

TECHNICAL FIELD

This invention relates to a portable radio housing having a switchless connector for connecting an external antenna, microphone, speaker, battery charger and the like to a portable radio transceiver.

BACKGROUND OF THE INVENTION

Portable radio transceiver units are generally selected for pedestrian use. Often a portable unit user will have a need for radio communication while in a vehicle. The portable unit, when located inside the vehicle may not perform satisfactorily over long distances because either the portable antenna is insufficient or the vehicle body shields the portable antenna. Thus the user must either purchase a separate mobile unit or use the portable unit with an external mobile antenna.

FIG. 1 and FIG. 2 show a conventional method of connecting a portable unit antenna to an external antenna. Portable radios embodying the design illustrated require a changeover switch 5. These changeover switches 5 function to disconnect or connect the internal and external antennas such that the two antennas are not connected at the same time. FIG. 1 shows the changeover switch 5 in the external antenna position while FIG. 2 illustrates the switch 5 in the internal antenna position.

Conventionally an antenna jack (not shown) is used to actuate the changeover switch 5. The antenna jack is disposed on the exterior of a portable unit and is adaptable to receiving a plug which is electrically coupled to an external antenna.

In operation, insertion of the plug into the antenna jack on the portable radio actuates the changeover switch 5. The changeover switch 5 will be in the internal antenna position as long as a plug is not inserted into the antenna jack.

As is known by those skilled in the art, the addition of components in a radio frequency (RF) circuit causes losses. Thus, the addition of a changeover switch and an antenna jack will result in a degradation of efficiency.

Also the changeover switch is a mechanical device which would be subject to cyclic wear and perhaps require replacement during the life of the portable unit. Moreover, the changeover switch and the antenna jack are items which increase the manufacturing cost of portable units which are adaptable to be used with an exteral antenna.

Thus, there exists a need to provide a means of connecting a portable radio to an external antenna while minimizing RF insertion losses and manufacturing costs. Such a means would be widely received by the industry.

SUMMARY OF THE INVENTION

In accordance with the present invention a portable radio housing is disclosed adapted to being mounted in a vehicle with an external antenna for removably mounting a portable radio therein.

The housing utilizes a switchless contact located inside the housing and which is electrically coupled to an external antenna. This contact is adaptable to making touch contact with a similar antenna contact on the outside of a portable radio, when the radio is inserted into the housing. This antenna contact obviates the need for a changeover switch or antenna jack thus reducing costs and RF losses.

The portable radio used with the mobile mount can contain an internal antenna electrically coupled to a contact on the outside of the radio case and adaptable to making touch contact with the antenna contact located inside the mobile housing. Thus when the portable radio is inserted into the mobile mount, the electrical contact in the portable radio makes electrical contact with the contact in the mobile housing, thus connecting the portable radio to the external antenna.

In accordance with the present invention, the portable radio internal antenna is not physically disconnected from the radio when it is inserted into the housing. Once the portable radio is inserted into the mobile mount, it is shielded by the mobile mount housing thus obviating the need to disconnect it. Thus the apparatus is a truly switchless external antenna connector.

Similarly, switchless contacts on the portable radio and inside the mobile mount can be used to connect the portable unit to an external microphone, speaker, battery charger and the like.

Numerous other advantages and features on the present invention will become readily apparent from the following description of the invention and its various embodiments and from the claims and from the accompanying drawings.

BRIEF DESCRIPTION OF THE DRAWINGS

FIG. 7 is a partial view of the mobile mount housing with a portable radio inserted therein in accordance with the present invention.

DETAILED DESCRIPTION

Figure 1:
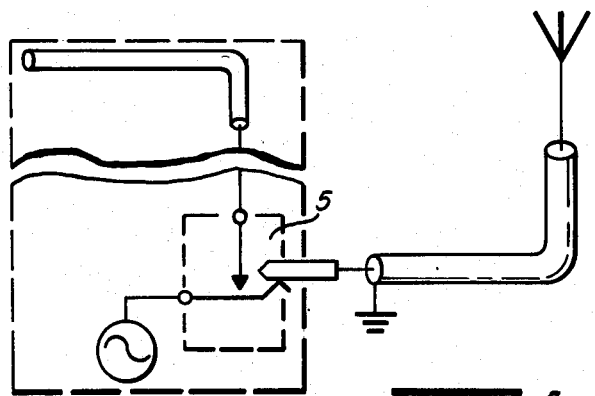
FIG. 1 is a pictorial representation of a portable radio connected with a changeover switch in the external antenna position.

While this invention is susceptible of embodiment in many different forms, there is shown in the drawings, which will herein be described in detail, a preferred embodiment of the invention. It should be understood; however, that the present disclosure is to be considered as an exemplification of the principles of the invention and is not intended to limit the invention to any specific embodiment illustrated.

Figure 3:
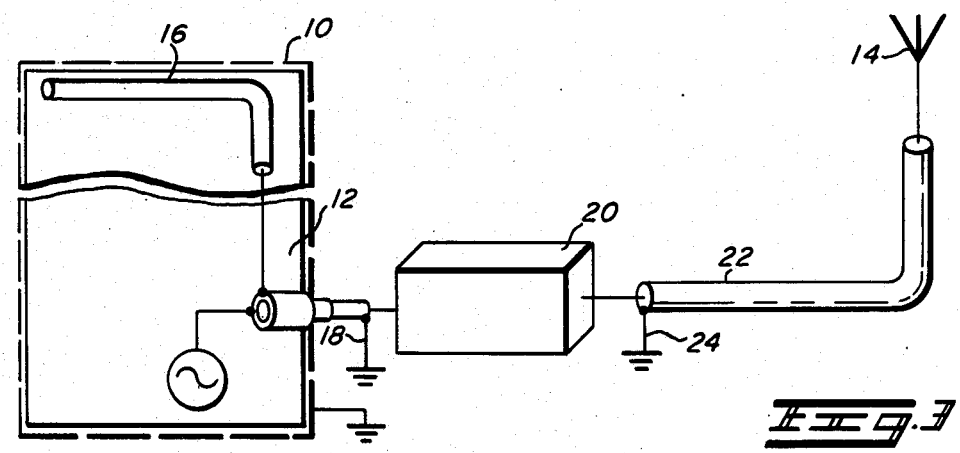
FIG. 3 is a pictorial representation of the switchless antenna connector in accordance with the present invention.

Referring to the drawings, FIG. 3 is an illustration of the housing 10 adaptable to receiving a portable radio transceiver 12 and connecting an external antenna 14 thereto when the portable radio transceiver 12 is inserted into the housing 10. As shown in FIG. 3, the portable radio transceiver 12 illustrated, contains an internal antenna 16, which is depicted as an inverted L type antenna 16. As will become apparent to those skilled in the art, the invention can also be practiced with other type antennas and even antennas which are removable from the portable radio 12.

However, when the invention is practiced with portable radio transceivers 12, which have internal antennas 16, it is necessary to shield such antenna to prevent it from radiating. This is done by fabricating the housing 10 from an electrical conductor material. This is essential to create a electrostatic radiation shield for the internal antenna 16. As is known by those skilled in the art, the efficiency of the shield is a function of its' conductivity. Therefore, by using materials which have a greater electrical conductivity the efficacy of the shield is thus improved. In the preferred embodiment, the housing 10 is plated with copper and coated with zinc to reduce oxidation. Also for the housing 10 to be an effective shield it is necessary that the housing 10 be connected to ground. The ground connection 18 is shown schematically in FIG. 3.

In operation, when the transceiver 12 is being used as a portable unit, the internal antenna 16 will be fully functional. However, once the transceiver 12 is inserted into the housing 10, the internal antenna is 16 prevented from radiating by the housing 10. Thus, the transceiver 12 is adaptable to being operated with an external antenna 14 without disconnection of the internal antenna.

The housing 10 may also contain an impedance matching network 20. This network 20 is used to match the transceiver 12 output impedance with the impedance of the external antenna 14. As is known by those skilled in the art, it is necessary to match the transceiver 12 output impedance with the transmission line impedance attached thereto and to match the transmission line impedance with the impedance of the antenna. Failure to match the impedance results in standing waves which are undesirable.

Figure 6:
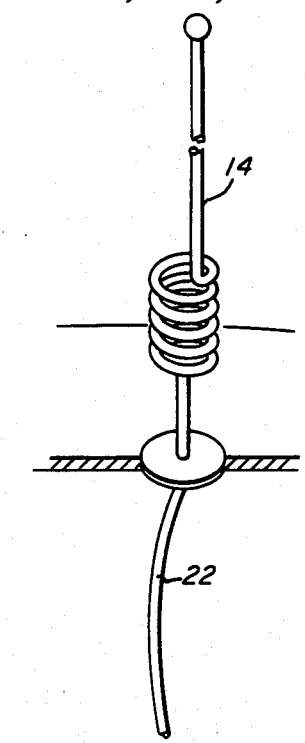
FIG. 6 is a pictorial view of an external antenna mounted on a mobile unit.
Figure 2:
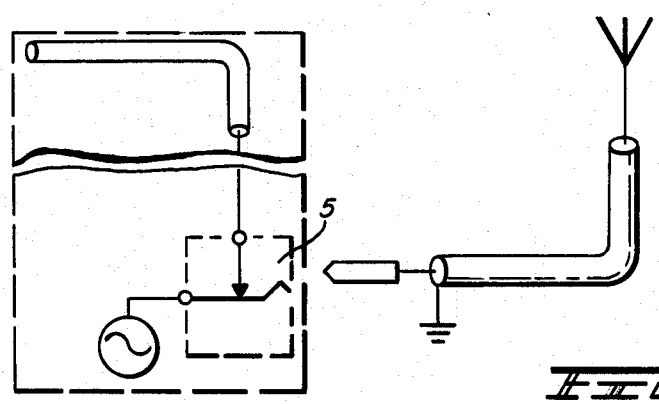
FIG. 2 is an illustration of the portable radio in FIG. 1 with the changeover switch in the internal antenna position.

As shown in FIG. 6, the external antenna 14 may be mounted on the roof of the mobile vehicle and connected to the housing 10 and the impedance matching network by way of a coaxial cable 22 connected therebetween. The impedance of the coaxial cable 22 is dictated by the impedance of the external antenna 14. Typically an external antenna 14 used in a mobile unit will be a vertical omni-directional whip antenna with an impedance of 50 Ohms. This would require a 50 Ohms coaxial cable 22, which is conventionally available. The coaxial cable 22 is terminated at the external antenna 14 using conventional hardware (not shown). The other end is shown terminated at the matching network circuit 20. The outer conductor of the coaxial cable 22 is connected to ground 24.

Figure 4:
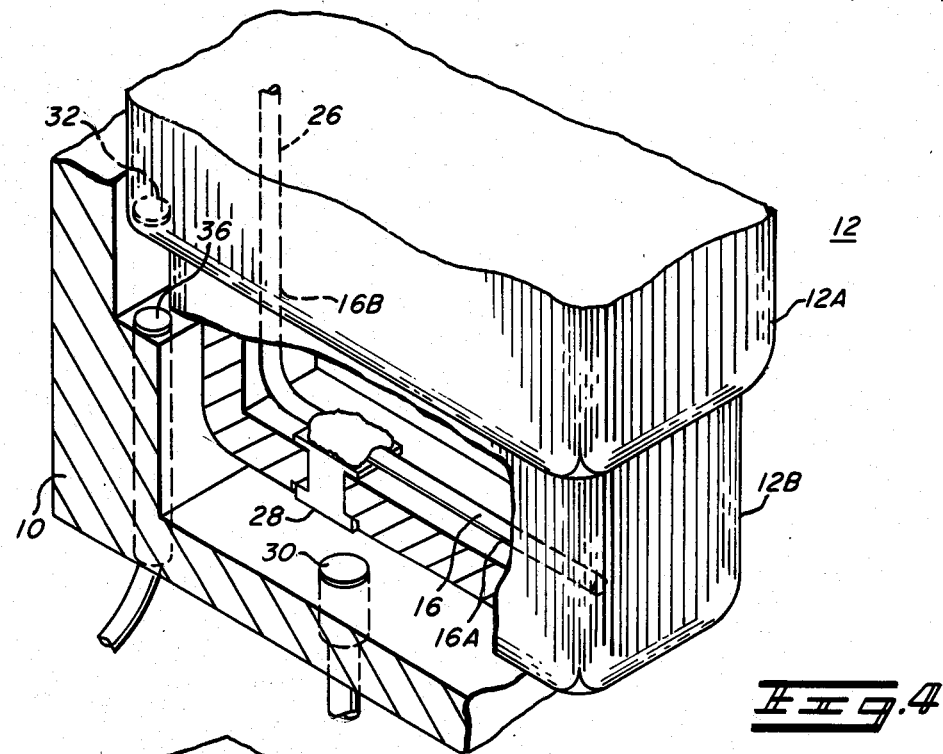
FIG. 4 is a partial view of the portable radio/mobile mount in accordance with the present invention.

Referring to FIG. 4, an adaptation of one embodiment of the present invention is illustrated wherein a partial view of the radio transceiver 12 case is shown inserted into the mobile mount 10. The transceiver 12 electronic components and circuitry (not shown) are mounted in upper portion 12A of the transceiver housing 12. The bottom portion 12B of the transceiver housing 12 is used to house an internal antenna 16 for the transceiver 12. This antenna 16 is connected to the transceiver circuitry by way of an internal coaxial cable 26 shown in phantom.

The bottom portion 12B of the transceiver housing is comprised of a nonmetallic material. This is essential to allow the internal antenna 16 to radiate when the transceiver 12 is being used as a portable unit. The bottom portion 12B is sized to house the transceiver 12 internal antenna 16. As illustrated, the transceiver 12 is connected to an inverted L type antenna 16 which is located at the bottom of the transceiver 12. As will be appreciated by those skilled in the art, the invention can also be practiced with other types of internal transceiver antennas and is not to be considered limited to only those having an inverted L type antenna.

The inverted L antenna 16 has two straight portions, 16A and 16B, which form a 90 degree angle and hence an L shape. Any point along the two sections 16A and 16B may be used to connect to an antenna contact 28. In the preferred embodiment, the point is selected so as to match the impedance of external antenna 14 without the use of a separate matching network 20.

The antenna contact 28 is disposed on the exterior of the lower portion 12B of the transceiver housing 12. This antenna contact 28 is comprised of an electrically conductive material so as to electrically couple a contact point on the outside of the transceiver housing 12 with the transceiver 12 internal antenna 16. As shown in FIG. 4., an electrically conductive path from the antenna contact 28 to the transceiver 12 internal circuitry is formed by way of the antenna 16 soldered to the contact 28. The antenna contact 28 is in series with a portion of the internal antenna 16 which is connected to the internal transceiver circuitry by way of the coaxial cable 26.

The antenna contact 28 can be made from a metallic eyelet mounted on the outside of the transceiver housing 12 and electrically coupled to the internal antenna 16. This eyelet can then be soldered or placed in friction contact with the internal antenna 16.

An alternate method is to utilize the eyelet like apparatus as a guide readily adaptable to receiving the center conductor of a coaxial cable 22. In this design the eyelet would be located on the exterior of the transceiver housing 12 so as to be aligned with a portion of the internal antenna 16. Thus insertion of the center conductor of a coaxial cable into the eyelet would result in electrical contact with a portion of inverted L type internal antenna 16, which is coupled to the transceiver 12 circuitry. It is also within the breadth and scope of the invention to use it with a portable transceiver 12 having a removable external antenna. In this embodiment, the antenna would have to be removed so as to prevent the parallel operation of it with the external antenna 16. Similar to the aforementioned embodiments, an antenna contact 28 would be mounted on the bottom of the case. This antenna contact 28 would be coupled to the antenna circuitry inside the transceiver 12.

In the preferred embodiment, the transceiver 12 will have an internal inverted L type antenna mounted at the bottom of the transceiver housing 12B. In this embodiment, a portion 16B of the internal antenna 16 can be used for impedance matching and thus obviate the need for separate impedance matching components. As is known by those skilled in the art a completely shielded antenna functions as reactance. The connection of the antenna contact 28 is such to match the impedance of the coaxial cable 22 connected between the mobile mount 10 and the mobile external antenna 14 at a particular frequency. In the embodiment shown, at a frequency of 800 Megahertz, the antenna contact 28 is connected or is to be aligned with the corner of the inverted L internal antenna 16.

If an impedance matching circuit 20 is necessary, this circuit could be placed under a false floor in the bottom of the mobile mount housing 10 and terminated to a contact mounted on the false floor. The impedance matching circuit 20 would be utilized with portable transceivers without internal antennas 16 for impedance matching and with portable transceivers with removable integral antennas.

In other embodiments, the antenna contact 28 is formed from an eyelet device mounted on the exterior of the radio housing 12 which is electrically coupled to an internal antenna terminal point on the printed circuit boards 34 inside the transceiver 12. Preferably the terminal point on the printed circuit board would be characterized by a mound of solder to facilitate connection of the antenna contact 28 thereto.

An alternate method is to place an eyelet in alignment with the printed circuit board terminal point. In this embodiment, the center conductor of a coaxial cable is inserted through the eyelet so as to come in electrical contact with the board terminal point. Preferably the board terminal point would be mounted near the bottom of the transceiver housing so as to be adaptable to making contact with a center lead of a coaxial cable disposed on the inside of the mobile mount 10.

Alternatively, connections between board terminal point and an antenna contact 28 can be made to the antenna contact, all of which are contemplated by the present invention. One way is to connect an electrical conductor (not shown) between the board terminal point and a metallic eyelet mounted on the outside of the transceiver housing 12.

Similar to the antenna contact 28, contacts for other auxiliaries can be disposed in the interior of the mobile mount housing 10 adaptable to mating with respective contacts on the portable transceiver 12. FIG. 4 illustrates auxiliary contact 36 mounted inside the mobile mount housing 10 so as to be in alignment and be in electrical contact with a corresponding contact 32 disposed on the exterior of the transceiver housing 12. It is contemplated that four contacts can be disposed in the housing for an external antenna, external microphone, external speaker and an external battery charger. The housing 10 is also adaptable for use with more than four contacts for connection of additional external devices. Each contact disposed inside the housing 10 is to be connected to a remote auxiliary (e.g. antenna, microphone, etc.) located inside the vehicle.

Figure 5:
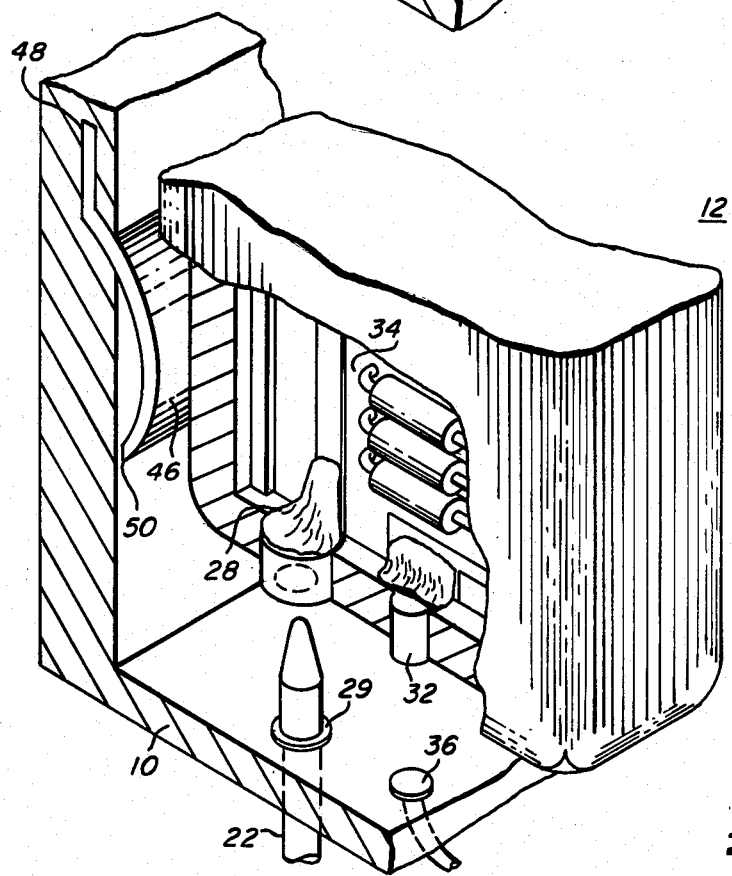
FIG. 5 is a cutaway view of an alternate embodiment of the portable radio/mobile mount illustrated in FIG. 3.

FIG. 5 illustrates an alternate embodiment wherein the center conductor of the coaxial cable is used to directly contact the antenna contact 28 inside the radio 12. The internal contact 28 is formed by a buildup of solder aligned such that the coaxial conductor 22 will be in electrical contact therewith when the portable unit 10 is inserted into the housing 10. This contact 28 is electrically coupled to internal circuitry within the portable unit 12.

Also as shown in FIG. 5, one or more resilient leaf springs 46 can be disposed inside the mouth of the housing 10 for electrical contact and proper alignment of the portable transceiver 12 into the housing 10. These springs 46 can be leaf-like springs secured to the housing 10 at one end and prestressed to form a parabolic-like shape with the curvature facing toward the outside of the housing 10. The other end 50 of the spring 46 provides alignment of the transceiver 12 within the housing 10 as well as providing electrical contact between the top portion 12A of the transceiver housing 12 and the mobile mount housing 10.

Since the mobile mount 10 acts as an antenna shield, it is important that good electrical contact be made between the transceiver housing 12 and the mobile mount 10. In the preferred embodiment, springs are disposed around the entire inner perimeter of the mobile mount 10 so as to be in contact with the outer surface perimeter of the transceiver 12. This minimizes losses in the shield.

As shown in FIG. 7, housing 12 shown semiflush mounted within a vehicle console 44. Mounting the housing 10 as shown provides for efficient use of space within the vehicle as well as being ergonomically optimum. In the preferred embodiment the housing 10 is mounted such that the back of transceiver 12 will be about a 10°–40° from the console.

When the system is installed in a vehicle, the microphone 35, speaker 37 and external antenna 14 will be prewired to contacts disposed inside the housing 12. Similarily the transceiver will be equipped with corresponding contacts disposed on its exterior which will be in alignment with those contacts in the case when the transceiver is fully inserted into the housing 10.

Thus it should be apparent that a unique portable radio and mobile mount housing have been disclosed. These apparatus' are readily adaptable to conventional design practices. Moreover, while this invention is described in conjunction with specific embodiments, it should be apparent that there are alternatives, modifications and variations which will be apparent to those skilled in the art of the foregoing description. Accordingly, it is intended to cover all such alternatives, modifications and variations that fall within the spirit and broad scope of the appended claims.

We claim:

1. A portable radio for insertion into a radio mount having an electrostatic shield and having an external antenna contact electrically connected to an external antenna, said portable radio comprising in combination:
 a housing having an internal antenna, whereby said electrostatic shield inhibits said internal antenna from radiating when said portable radio is inserted into said radio mount; and
 an internal antenna contact adapted for electrical connection to said external antenna contact of said radio mount, said internal antenna contact being connected at a selected point on said internal antenna, whereby said internal antenna provides impedance matching between said portable radio and said external antenna.

2. A radio housing adaptable to being mounted in a mobile unit with an external antenna, for removably mounting a portable radio having an internal antenna and an internal antenna contact therein, said radio housing comprising:
 a housing adaptable to receiving said portable radio, said housing including an electrostatic shield for shielding said internal antenna when said portable radio is inserted therein;
 first contact means carried by the inside of said housing, adaptable to being electrically coupled to said external antenna for making electrical touch contact with said internal antenna contact of said portable radio when said portable radio is inserted into said housing.

3. A radio housing as described in claim 2 wherein said housing has a metal plating.

4. A radio housing as described in claim 3 wherein said metal plating comprises copper.

5. A radio housing as described in claim 3 wherein said metal plating is coated with zinc to reduce oxidation.

6. A radio housing as described in claim 2 wherein said internal antenna of said portable radio is used to impedance match the portable radio output with said external antenna.

7. A radio mount adaptable to being mounted in a mobile unit with an external antenna for removably mounting a portable radio having at least one electrically conductive terminal on its exterior and an internal antenna, said radio mount comprising:

an electrically conductive housing which functions as an electrostatic shield for shielding said internal antenna of said portable radio when said portable radio is inserted into said housing; at least one static contact disposed inside said housing so as to be in alignment and to make contact with said conductive terminal on said portable radio when said portable radio is inserted into said housing, said contact adaptable to being electrically coupled to electrical apparatus disposed outside said housing; and impedance matching means for matching the impedance of said portable radio with said external antenna.

8. A radio mount as described in claim 7 wherein said shielded portable radio internal antenna is used to match the impedance of said portable radio with the impedance of said external antenna.

* * * * *